United States Patent
Wu

(10) Patent No.: US 6,513,515 B1
(45) Date of Patent: Feb. 4, 2003

(54) BARBECUE GRILL ASSEMBLY WITH A CASING

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 10/035,698

(22) Filed: Oct. 25, 2001

(51) Int. Cl.[7] .............................. A47J 37/00; F24C 3/00
(52) U.S. Cl. ...................... 126/41 R; 126/38; 126/276; 126/304 A; 126/40; 126/50; 248/129; 248/250
(58) Field of Search .............................. 126/304 R–306, 126/38, 9 B, 9 R, 41 R, 37 R, 276, 40, 50, 25 R, 37 A; 99/467, 482; 248/129, 250

(56) References Cited

U.S. PATENT DOCUMENTS

| | | | | |
|---|---|---|---|---|
| 2,742,033 A | * | 4/1956 | Bramming | 126/38 |
| 2,852,016 A | * | 9/1958 | Weatherwax | 126/38 |
| 6,041,769 A | * | 3/2000 | Llodra, Jr. | 126/41 R |
| 6,276,356 B1 | * | 8/2001 | Ragland et al. | 126/41 R |
| 6,293,272 B1 | * | 9/2001 | Harneit | 126/41 R |

* cited by examiner

Primary Examiner—James C. Yeung
(74) Attorney, Agent, or Firm—Ostrolenk, Faber, Gerb & Soffen, LLP

(57) ABSTRACT

A barbecue grill assembly includes a cook unit and a casing. The cook unit has a cooking base, a grill member disposed in the cooking base, a top cover, and a handle formed on the top cover. The casing includes front and rear casing parts that have first edges hinged to each other, and second edges fastened releasably to each other by a pair of fastening units. The casing is formed with two handle openings at the second edges, and is mounted with a wheel unit and a pull member above the wheel unit. The casing confines a receiving space for receiving the cook unit. The handle on the cook unit is extendible through the handle openings. The pull member is operable for pulling the casing to move along a ground surface by virtue of rolling contact of the wheel unit with the ground surface. The casing is adapted to be disposed uprightly on a ground surface for supporting the cook unit thereon.

23 Claims, 12 Drawing Sheets

BARBECUE GRILL ASSEMBLY WITH A CASING

BACKGROUND OF THE INVENTION

1. Field of the Invention

The present invention relates to a barbecue grill assembly, more particularly to a barbecue grill assembly having a casing which facilitates transport and storage thereof.

2. Description of the Related Art

A conventional barbecue grill assembly generally includes a cook unit installed with a barbecue grill, and a leg unit for supporting the cook unit above a ground surface. The leg unit may be installed with wheels to permit movement of the barbecue grill assembly along the ground surface, and the cook unit may be removable from the leg unit when it is not in use. However, difficulties exist during transport of the conventional grill assembly. The conventional barbecue grill assembly still occupies a relatively large amount of storage space when it is not in use, especially when the leg unit is designed to be unfoldable.

SUMMARY OF THE INVENTION

Therefore, the main object of the present invention is to provide a barbecue grill assembly having a casing which facilitates transport and storage thereof.

According to one aspect of the present invention, a barbecue grill assembly includes a cook unit, and a casing. The cook unit includes a cooking base with top and bottom sides, a grill member disposed in the cooking base, a top cover disposed on the top side for covering the grill member and the top side of the cooking base, and a handle mounted on one of the cooking base and the top cover. The casing has first and second end walls which are spaced apart from and which are opposite to each other in a longitudinal direction, and a surrounding wall extending between and cooperating with the first and second end walls to confine a receiving space for receiving the cook unit therein. The surrounding wall is formed with at least one handle opening that permits extension of the handle out of the casing. The casing includes front and rear casing parts which are formed with the first and second end walls and the surrounding wall. The front and rear casing parts have adjacent first edges hinged to each other, and second edges opposite to the first edges, respectively. The casing further includes a fastening unit provided on the front and rear casing parts for releasably fastening together the second edges of the front and rear casing parts.

According to another aspect of the present invention, a barbecue grill assembly includes a cook unit and a casing. The cook unit includes a cooking base with top and bottom sides, a grill member disposed in the cooking base, and a top cover disposed on the top side for covering the grill member and the top side of the cooking base. The casing has first and second end walls which are spaced apart from and which are opposite to each other in a longitudinal direction, and a surrounding wall extending between and cooperating with the first and second end walls to confine a receiving space for receiving the cook unit therein. The casing is adapted to be supported on a ground surface in an upright position in which the first end wall is disposed above the second end wall. The casing further includes a wheel unit mounted on the surrounding wall proximate to the second end wall, and a pull member mounted on the surrounding wall proximate to the first end wall and disposed above the wheel unit. The wheel unit is adapted to contact rotatably the ground surface when the casing is in the upright position. The pull member is adapted to be gripped for pulling the casing and enabling the casing to move horizontally along the ground surface when the casing is disposed in the upright position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
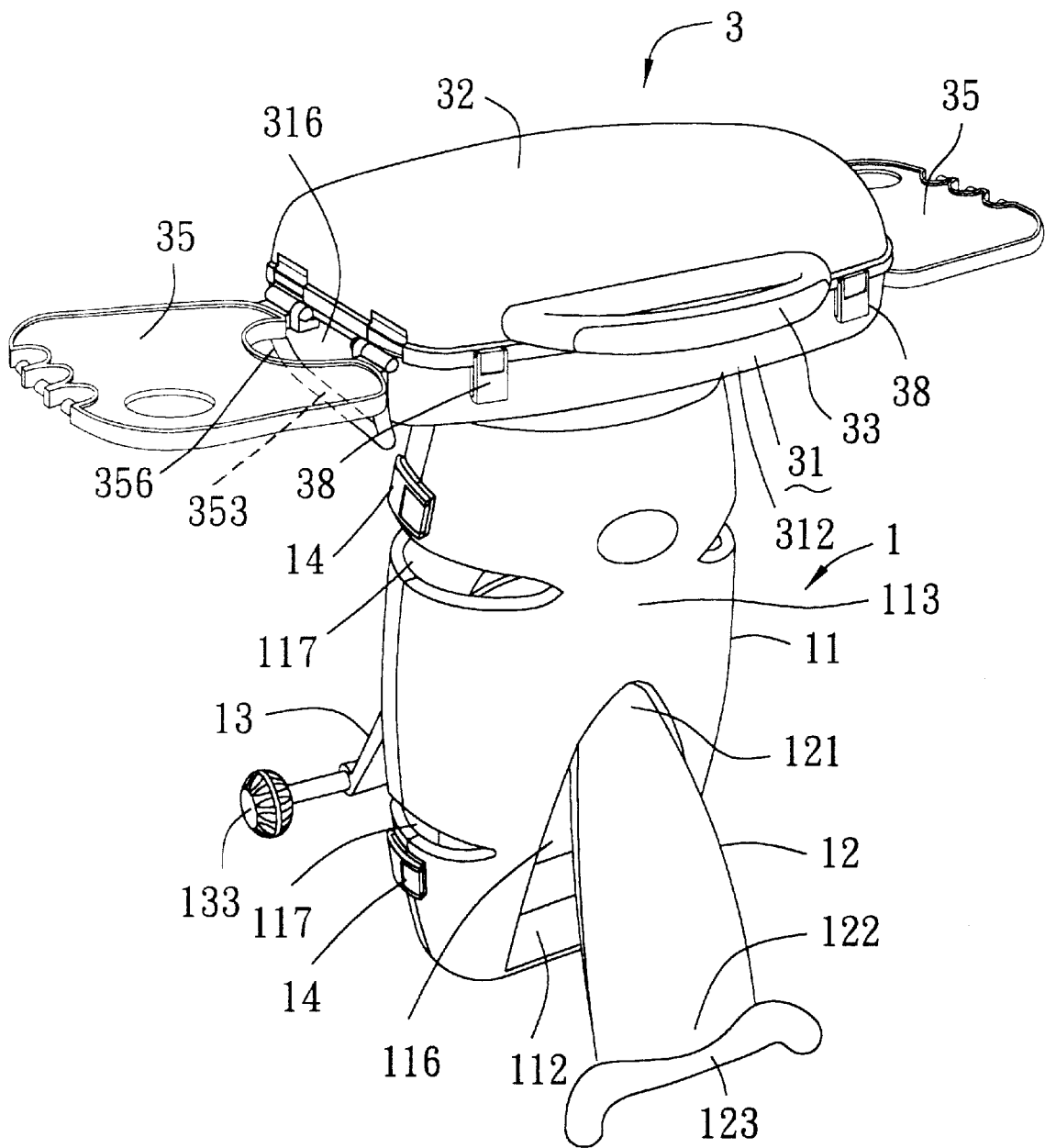
FIG. 1 is a perspective view of a first preferred embodiment of the barbecue grill assembly of the present invention.

Before the present invention is described in greater detail, it should be noted that like elements are denoted by the same reference numerals throughout the disclosure.

Figure 2:
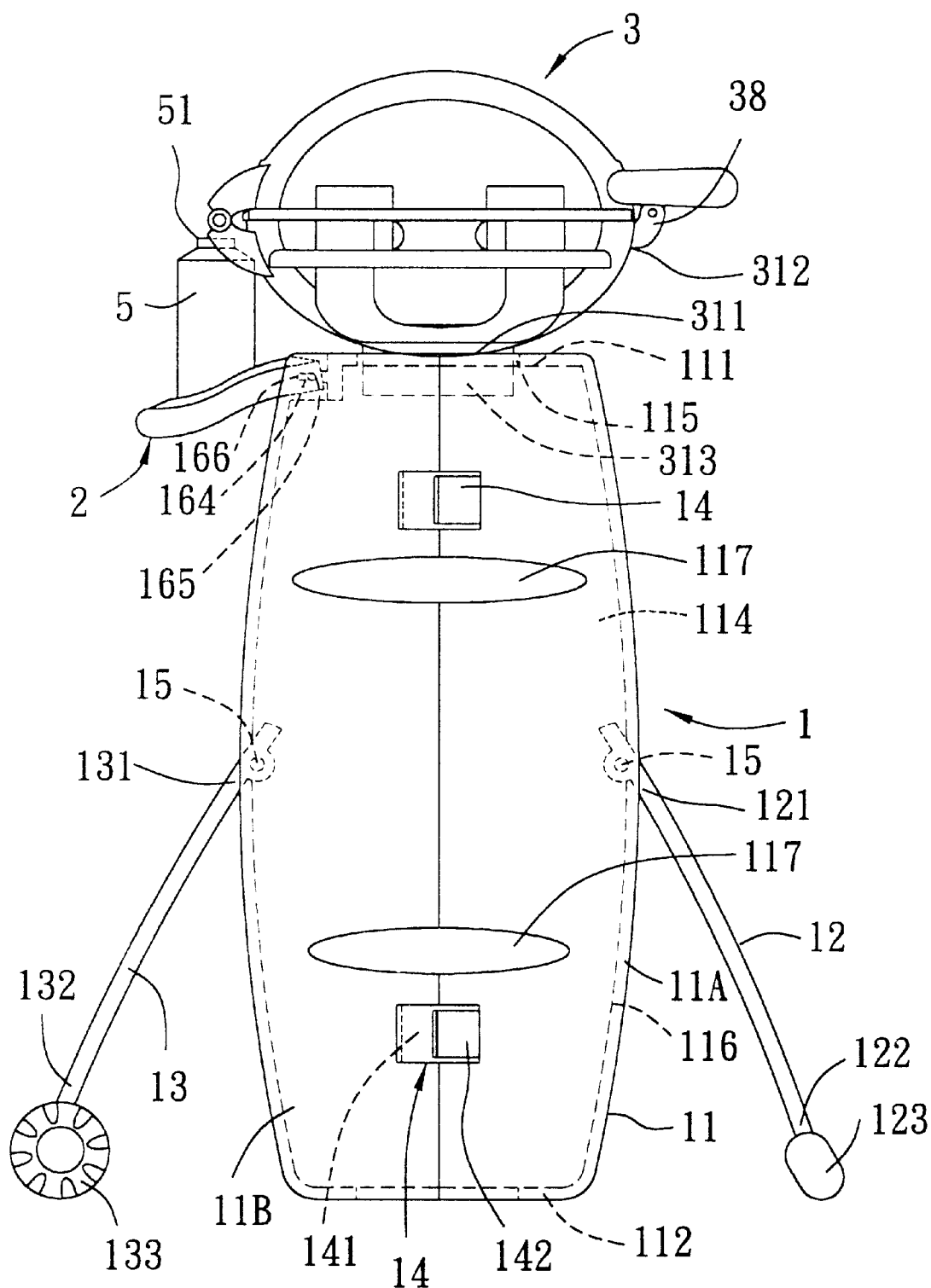
FIG. 2 is a side view of the barbecue grill assembly of FIG. 1.

Referring to FIGS. 1 and 2, the first preferred embodiment of the barbecue grill assembly of the present invention is shown to mainly include a cook unit 3 and a casing 1.

The casing 1 is adapted to be disposed uprightly on a ground surface for supporting the cook unit 3 thereon. The casing 1 has a first end wall 111, a second end wall 112 opposite to and spaced apart from the first end wall 111 in a longitudinal direction of the casing 1, and a surrounding wall 11 extending between the first and second end walls 111, 112 and cooperating with the first and second end walls 111, 112 to confine a receiving space 114. The surrounding wall 11 has a main portion 113 formed with a pair of openings 116 adjacent to the second end wall 112, and front and rear support plates 12, 13 disposed in the openings 116. Each of the front and rear support plates 12,13 has a hinge end 121, 131 hinged to the main portion 113 via a respective pivot shaft 15, and a distal end 122, 132 opposite to the hinge end 121, 131 and disposed proximate to the second end wall 112. When the casing 1 is disposed in an upright position for supporting the cook unit 3, the first end wall 111 is disposed on top, while the second end wall 112 is disposed at the bottom. The distal end 122 of the front support plate 12 is widened to form a foot portion 123. The distal end 132 of the rear support plate 13 is installed with a wheel unit which includes a pair of spaced-apart wheel members 133. The distal end 122, 132 of each of the front and rear support plates 12, 13 is pivotable away from the main portion 113 of the surrounding wall 11 to enable the wheel members 133 and the foot portion 123 to abut against the ground surface so as to help support the casing 1 in the upright position on the ground surface. The distal ends 122, 132 of each of the front and rear support plates 12, 13 is further pivotable toward the main portion 113 of the surrounding wall 11 to enable the respective one of the front and rear support plates 12, 13 to fill in the corresponding opening 116. The first end wall 111 is formed with an opening 115.

Figure 3:
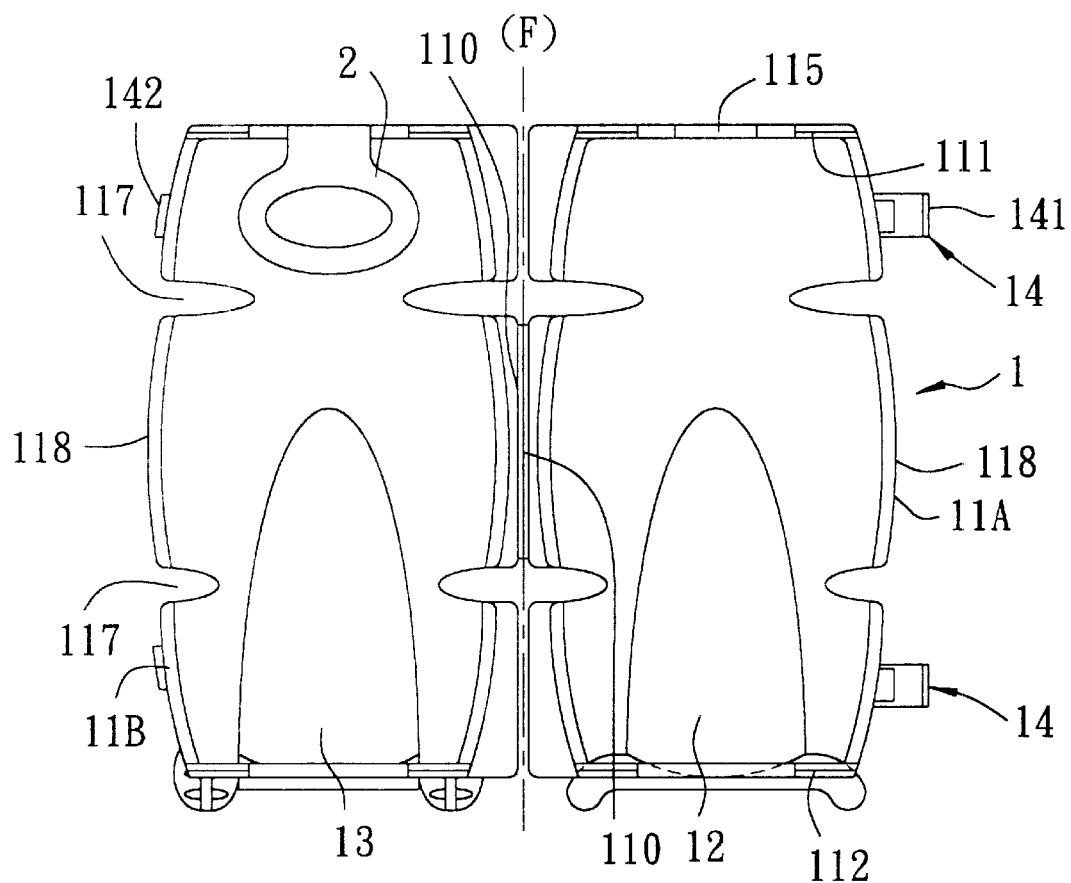
FIG. 3 is a schematic view showing a casing of the barbecue grill assembly of FIG. 1 when unfolded.

With further reference to FIG. 3, the casing 1 includes front and rear casing parts 11A, 11B which are formed with the first and second end walls 111, 112 and the surrounding wall 11. The front and rear support plates 12, 13 are formed respectively on the front and rear casing parts 11A, 11B. The front and rear casing parts 11A, 11B have adjacent longitudinal first edges 110 connected integrally and hinged to each other such that the front and rear casing parts 11A, 11B are foldable toward each other along a substantially longitudinal folding line (F), and longitudinal second edges 118 opposite to the first edges 110, respectively. A pair of fastening units 14 are provided on the second edges 118 for releasably fastening together the second edges 118 of the front and rear casing parts 11A, 11B. Each of the fastening units 14 includes inter-engageable first and second fastening parts 141, 142 which are mounted respectively on the front and rear casing parts 11A, 11B and which engage releasably each other in a known manner. The second edges 118 of the front and rear casing parts 11A, 11B are notched to cooperatively define a pair of handle openings 117 when fastened together.

Figure 4:
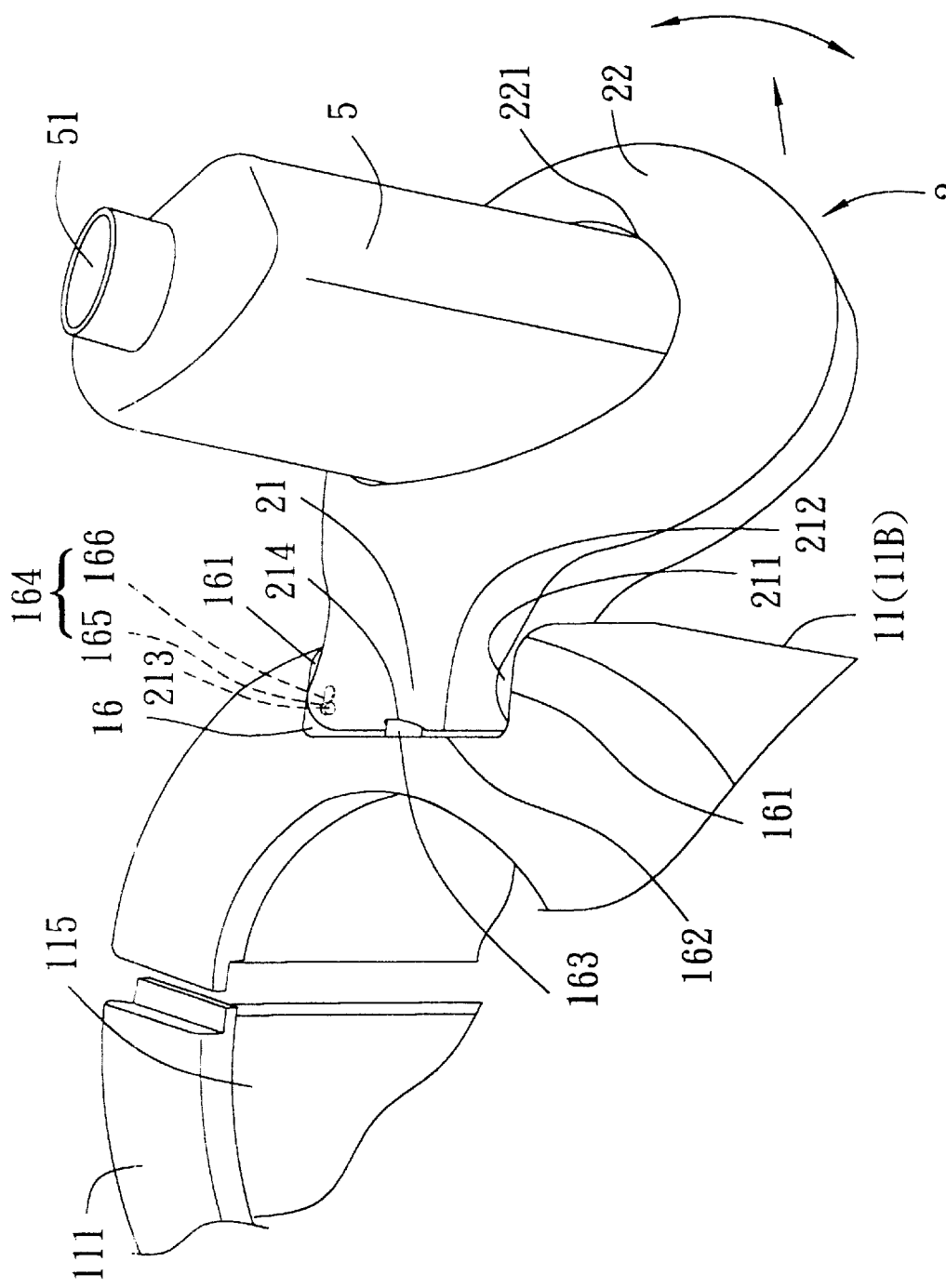
FIG. 4 is an enlarged fragmentary perspective view illustrating how a pull member is mounted on the casing of the barbecue grill assembly of FIG. 1.

Referring to FIGS. 3 and 4, the casing is installed with a pull member 2 to facilitate movement of the casing 1 along the ground surface by virtue of the wheel members 133. To mount the pull member 2, the surrounding wall 11 is formed with a mounting recess 16 adjacent to the top wall 111 and in the rear casing part 11B. The mounting recess 16 is defined by a pair of confronting side walls 161 and a connecting wall 162 interconnecting the side walls 161. Each of the side walls 161 is formed with an elongated mounting hole 164 which includes an inner hole portion 165 proximate to the connecting wall 162, and an outer hole portion 166 distal from the connecting wall 162 and adjacent to and communicated with the inner hole portion 165. The connecting wall 162 is formed with a locking rod 163 projecting into the mounting recess 16. The pull member 2 has a ring portion 22 and a mounting end portion 21 extending from the ring portion 22. The mounting end portion 21 has a pair of lateral surfaces 211 confronting the sidewalls 161 of the mounting recess 16, respectively, and an end face 212 interconnecting the lateral surfaces 211 and confronting the connecting wall 162 of the mounting recess 16. Each of the lateral surfaces 211 is formed with a pivot pin 213 that extends rotatably into the mounting hole 164 in a corresponding one of the side walls 161 and that is movable along the mounting hole 164 between the inner and outer hole portions 165, 166. The end face 212 is formed with a locking groove 214. When the pull member 2 is pushed inwardly into the mounting recess 16 for moving toward the connecting wall 162 so as to move the pivot pins 213 to the inner hole portions 165, the locking rod 163 is inserted into the locking groove 214 to lock the pull member 2 in an unfolded position, in which the pull member 2 is unfolded from the surrounding wall 11 of the casing 1 and has a substantially horizontal orientation. When the pull member 2 is pulled outwardly of the mounting recess 16 for moving away from the connecting wall 162 so as to move the pivot pins 213 to the outer hole portion 166, the locking rod 163 is removed and disengaged from the locking groove 214 to permit pivoting movement of the pull member 2 to a folded position, in which the pull member 2 is folded unto the surrounding wall 11. As such, when the pull member 2 is unlocked from the locking rod 163, the pull member 2 is movable pivotally relative to the casing 1 about an axis of the pivot pins 213. In use, a container 5 can be retained at a central hole 221 in the ring portion 22 of the pull member 2 when the pull member 2 is locked at the unfolded position.

Figure 5:
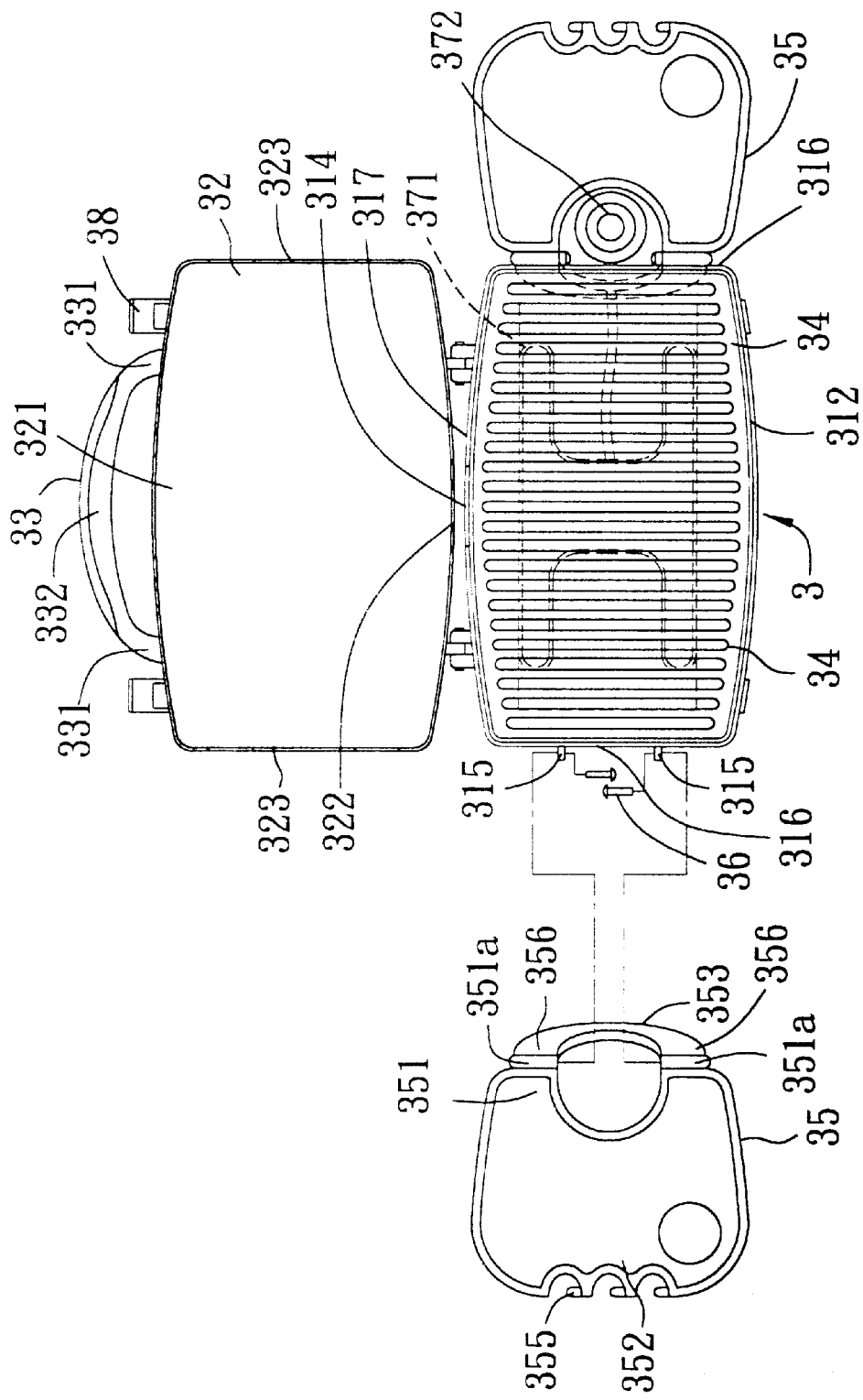
FIG. 5 is a top view illustrating how a pair of side racks are mounted on a cook unit of the barbecue grill assembly of FIG. 1.

Referring to FIGS. 1, 2 and 5, the cook unit 3 may be installed removably on the first end wall 111 of the casing 1 when the casing 1 is disposed in the upright position, or may be disposed at any other place that is suitable. The cook unit 3 includes a hollow cooking base 31, a grill member 34 disposed in the cooking base 31, a top cover 32 disposed on a top side of the cooking base 31 for covering the grill member 34 and the top side of the cooking base 31, a handle 33 mounted on the top cover 32, and fastening units 38 for releasably fastening together the top cover 32 and the cooking base 31. A burner 371 is installed within the cooking base 31 and is connected to a fuel connector 372 mounted externally of the cooking base 31. The fuel connector 372 is adapted to be connected to a fuel source (not shown) to permit the supply of fuel into the cooking base 31.

Each of the top cover 32 and the cooking base 3 is generally rectangular in shape. The cooking base 31 has a bottom wall 311, front and rear side walls 312, 317 and left and right side walls 316 that extend upwardly from the bottom wall 311. The top cover 32 has a rear edge 322 hinged to an upper edge of the rear side wall 317 of the cooking base 31, a front edge 321 opposite to the rear edge 322, and left and right edges 323 interconnecting the front and rear edges 321, 322. The fastening units 38 are provided on the front edge 321 of the top cover 32 and the front side wall 312 of the cooking base 31 for releasably fastening together the front edge 321 of the top cover 32 and an upper edge of the front side wall 312 of the cooking base 31. The handle 33 is secured to the top cover 32 adjacent to the front edge 321. The handle 33 has a pair of connecting end portions 331 connected to the top cover 32, and a gripping portion 332 extending between the connecting end portions 331 and spaced apart from the front edge 321 of the top cover 31. The upper edge of the rear side wall 317 is formed with a draining notch 314 adapted for draining liquid, such as oil generated during use of the cook unit 3, from the cooking base 31. The bottom wall 311 of the cooking base 31 has a mounting post 313 projecting from a bottom side thereof for extension into the opening 115 in the first end wall 111 of the casing 1.

A pair of side racks 35 are mounted on the left and right side walls 316 of the cooking base 31. Each of the side racks 35 has a first end portion 351 and a second end portion 352 opposite to and extending from the first end portion 351 in a first direction. The first end portion 351 is forked so as to form a pair of pivot portions 351a which are mounted pivotally on an upper edge of a respective one of the left and right side walls 316 of the cooking base 31 by means of a pair of pivot shafts 36 that extend through a pair of pivot lobes 315 provided on the respective one of the left and right side walls 316 of the cooking base 31. The second end portion 352 is formed with a plurality of hook projections 355 for hooking of various barbecue utensils (not shown) thereon. Each of the side racks 35 is mounted with a respective handle bar 353 at the first end portion 351 thereof. Each of the handle bars 353 is substantially U-shaped, and has two opposite ends 356 connected fixedly and respectively to the pivot portions 351a of a respective one of side racks 35. Each of the handle bars 353 extends from the respective one of the side racks 35 in a second direction transverse to the first direction.

Referring back to FIGS. 1 and 2, when the barbecue grill assembly of the present embodiment is in use, the casing 1 can be used as a stand for supporting the cook unit 3 above the ground surface. For this purpose, the casing 1 is disposed in the upright position on the ground surface, and the front and rear support plates 12, 13 are unfolded. At this time, the foot portion 123 of the front support plate 12, the wheel members 133 on the rear support plate 13, and the bottom wall 112 of the casing 1 are disposed to contact the ground surface. The casing 1 is thus supported on the ground surface in a relatively stable manner. The cook unit 3 is then disposed on top of the casing 1, and is mounted thereon by extending the mounting post 313 into the opening 115 in the first end wall 111 of the casing 1. To use the cook unit 3, the top cover 32 is turned upwardly for uncovering the top side of the cooking base 31, and the side tracks 35 are unfolded from the cooking base 31 so as to be disposed in a substantially horizontal orientation on left and right sides of the cooking base 31, and so that the handle bars 353 are oriented downwardly and abut against the left and right side walls 316 of the cooking base 31 for supporting the side racks 35 in the horizontal orientation. The pull member 2 is turned upwardly for moving to the unfolded position, and is locked thereat by virtue of the engagement between the locking rod 163 and the locking groove 214 (see FIG. 4). Then, the container is installed on the pull member 2 such that a top opening 51 of the container 5 is disposed immediately below and is registered with the draining notch 314 of the cooking base 31 to permit collection of the liquid drained from the cooking base 31 therein.

Figure 6:
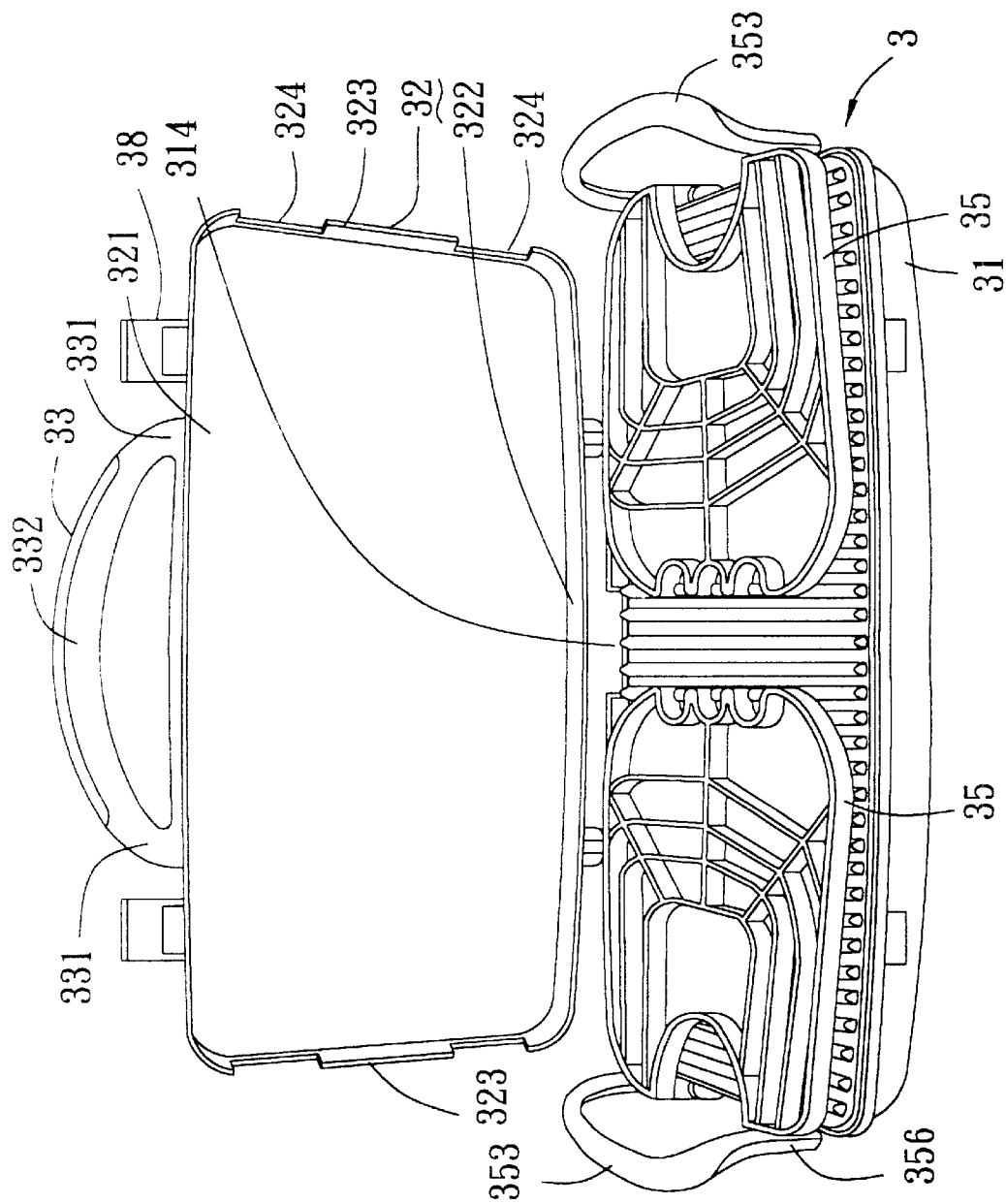
FIG. 6 illustrates the cook unit of FIG. 5 when the side racks are folded thereon.

Referring to FIG. 6, when it is desired to store the barbecue grill assembly of the present embodiment after use, the side racks 35 are turned inwardly into the cooking base 31 for moving to a folded position, in which the side racks 35 are disposed within the cooking base 31 above the grill member 34. The top cover 32 is then turned toward the cooking base 31 for covering the side racks 35 and the top side of the cooking base 32. It is noted that each of the left and right edges 323 of the top cover 32 has a pair of recessed portions 324 for accommodating the forked first end portion 351 of a respective one of the side racks 35 such that the top cover 32 can be disposed fittingly on top of the cooking base 31 for covering the same when the side racks 35 are disposed in the folded position. At this time, the handle bars 353 on the side racks 35 are oriented upwardly and are disposed externally of the cooking base 31 and the top cover 32 to permit gripping threat for handling the cook unit 3. Then, the top cover 32 is fastened to the cooking base 31 using the fastening units 38.

Figure 7:
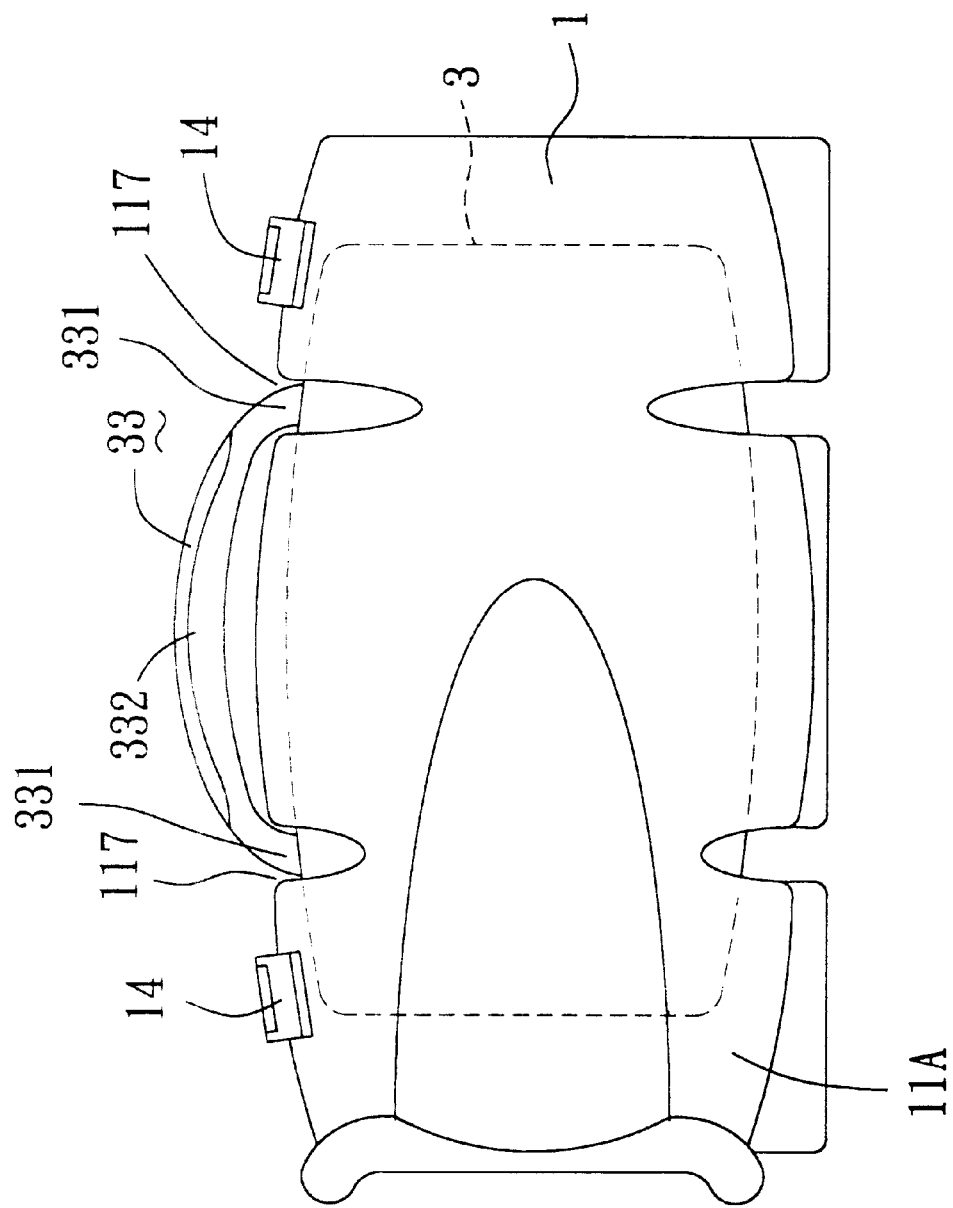
FIG. 7 illustrates the casing of the first preferred embodiment when the cook unit is received in the casing.

Referring to FIGS. 1, 3, 7, the cooking base 31 can then be received in the casing 1 in the following manner: The container 5 is removed from the pull member 2, and the front and rear support plates 12, 13 of the casing 1 are folded to fill in the openings 116. By unlocking the fastening units 14, the front casing part 11A can be turned away from the rear casing part 11B. The cook unit 3 is then disposed in the receiving space 114 of the casing 1 such that the connecting end portions 331 of the handle 33 are disposed respectively in the handle openings 117 and that the gripping portion 332 is disposed externally of the casing 1. The front casing part 11A is then folded toward the rear casing part 11B, and is fastened thereto using the fastening units 14. The entire barbecue grill assembly can thus be carried by gripping at the handle 33.

Figure 8:
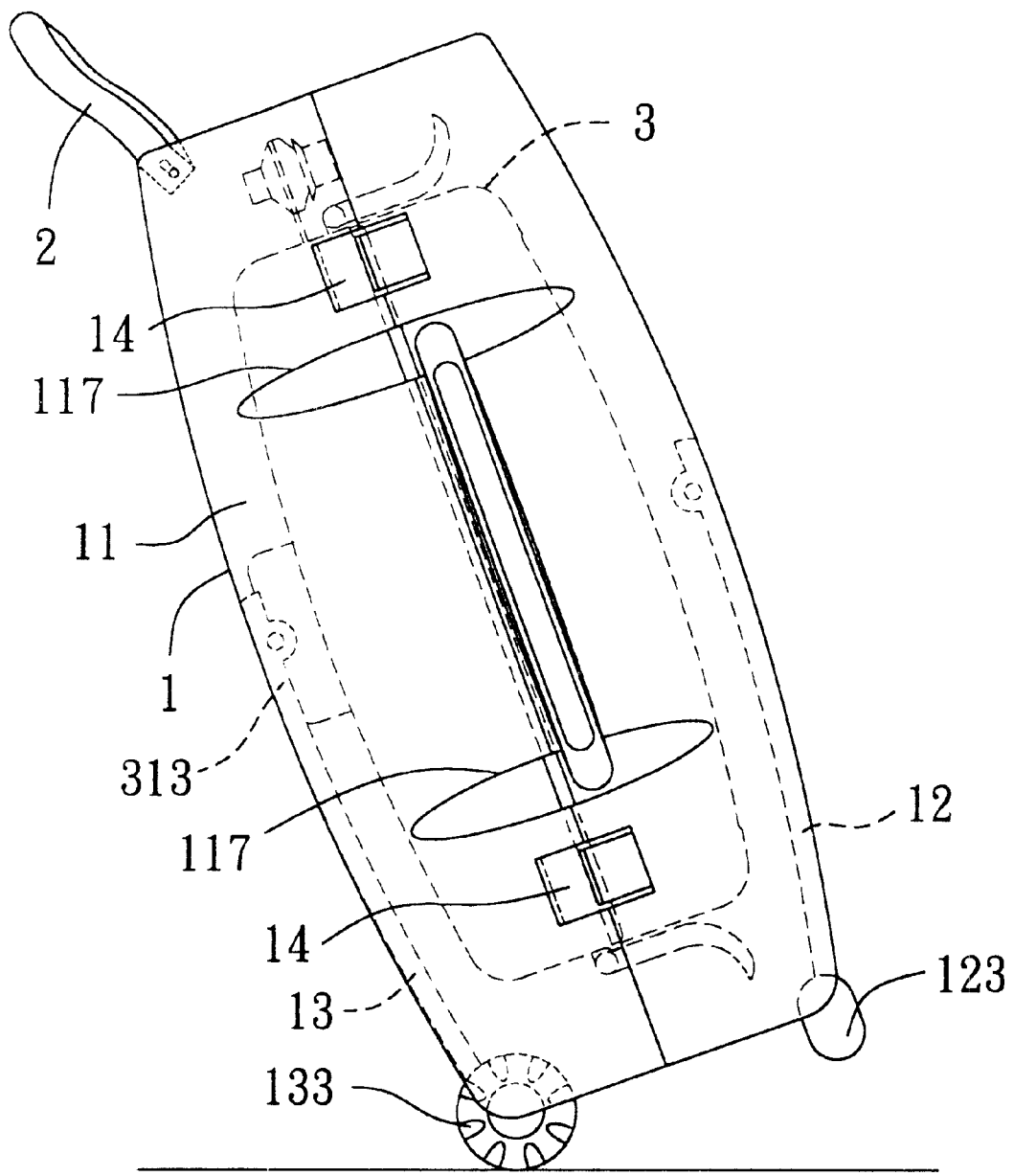
FIG. 8 illustrates how the casing of the first preferred embodiment is moved along a ground surface when the cook unit is received therein.

Referring to FIG. 8, alternatively, after the cook unit 3 is received in the casing 1, the casing 1 can be disposed in the upright position and can be moved horizontally along the ground surface by virtue of the wheel members 133 provided on the rear support plate 13. To move the casing 1, the casing 1 is slightly inclined, and the ring portion 22 of the pull member 2 is gripped by the user for pulling the casing 1 and moving the casing 1 horizontally along the ground surface by virtue of rolling contact between the wheel members 133 and the ground surface.

Figure 9:
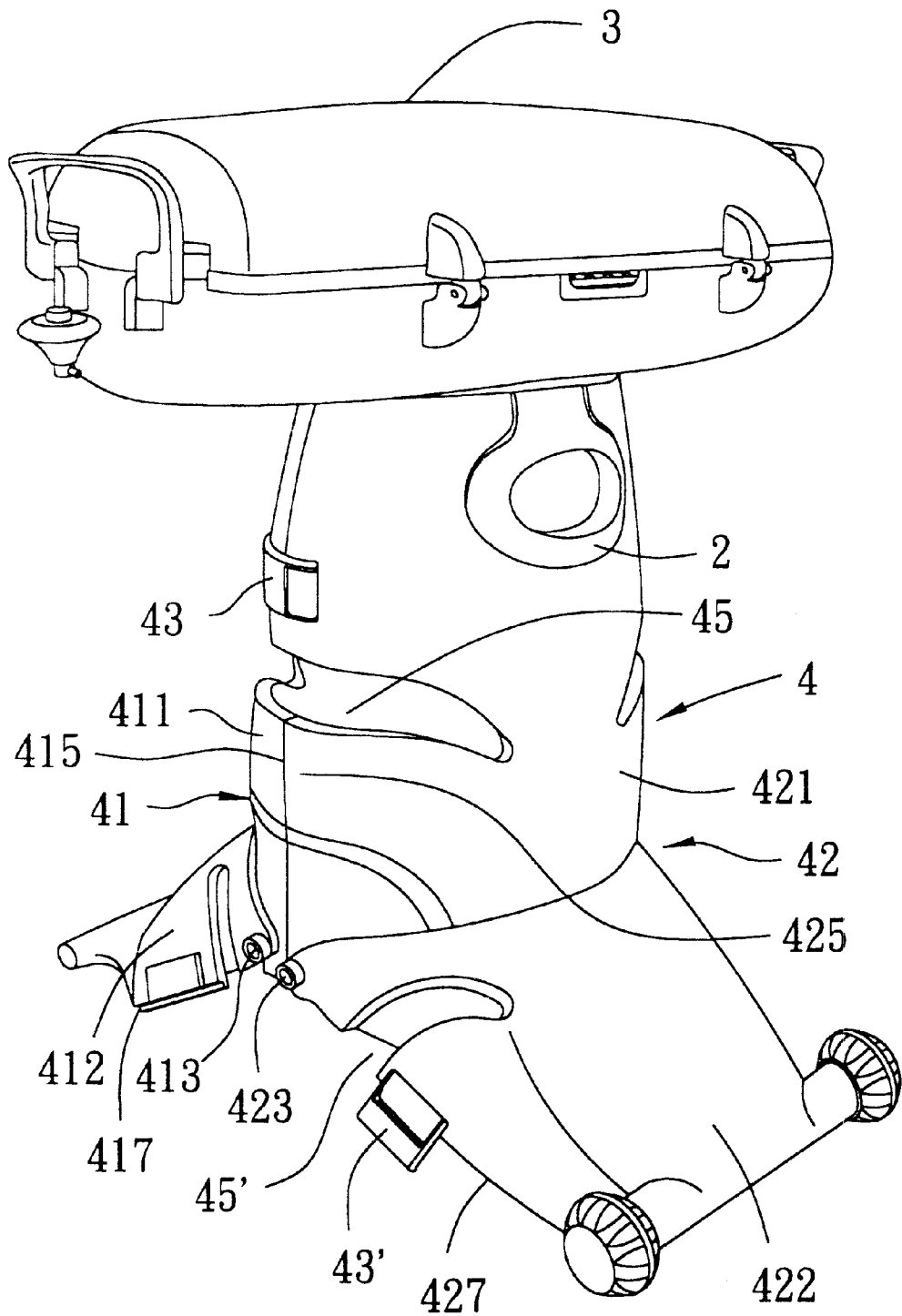
FIG. 9 is a perspective view of a second preferred embodiment of the barbecue grill assembly of the present invention.
Figure 10:
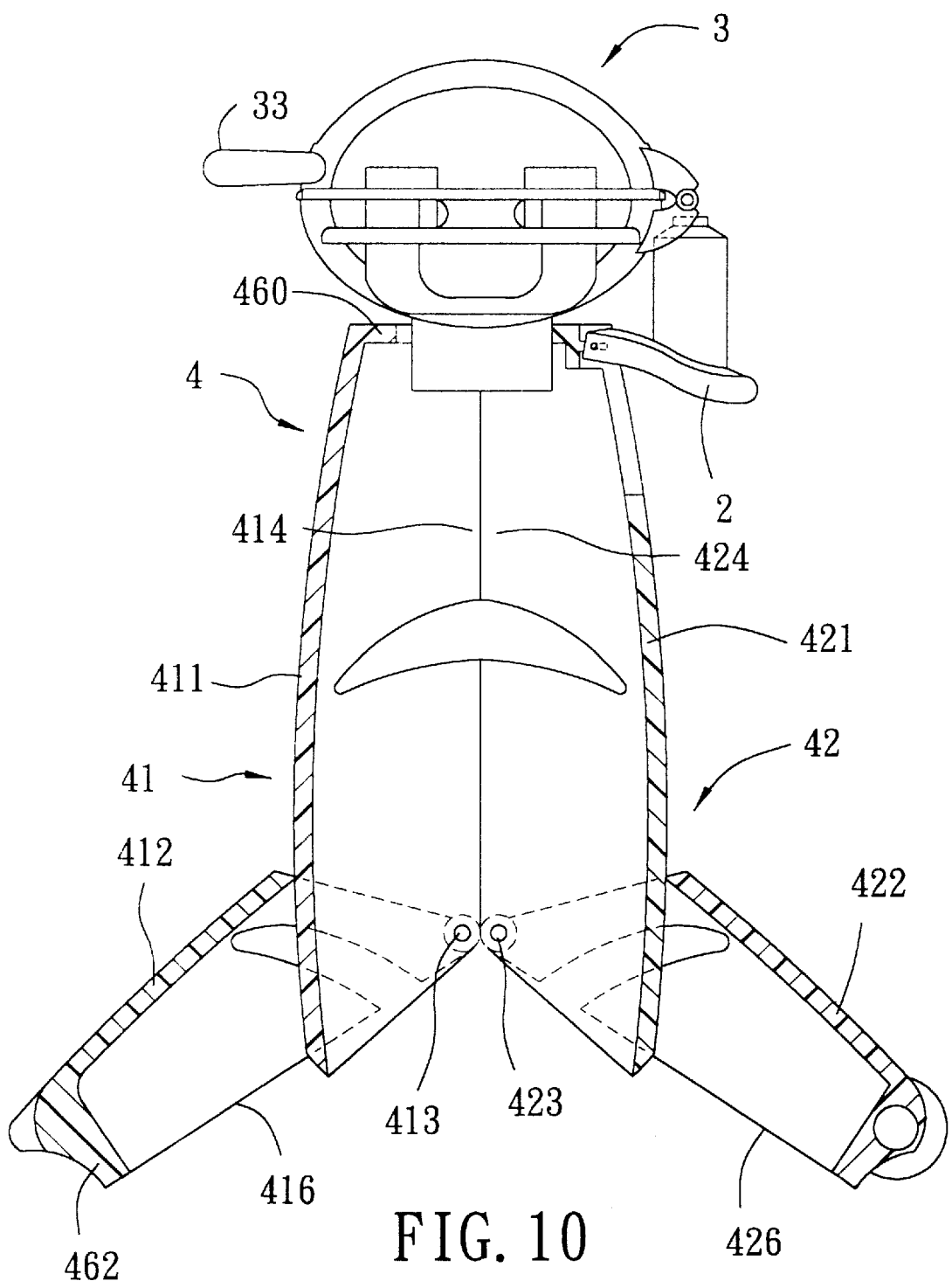
FIG. 10 is a partly-sectioned side view of the barbecue grill assembly of the second preferred embodiment.

Referring to FIGS. 9 and 10, in the second preferred embodiment of the barbecue grill assembly of the present invention, a casing 4, includes front and rear casing parts 41, 42, each of which has a first portion 411,421 and a second portion 412,422 which is connected pivotally to the first portion 411,421 by means of a respective pivot shaft 413, 423. The first portions 411, 421 of the front and rear casing parts 41, 42 cooperatively form a first end wall 460 and a first section of a surrounding wall of the casing 4. The second portions 412, 422 of the front and rear casing parts 41, 42 cooperatively form a second end wall 462 and a second section of the surrounding wall of the casing 4. The first portions 411, 421 of the front and rear casing parts 41, 42 have adjacent first edges 414, 424 hinged to each other, and second edges 415, 425 which are opposite to the first edges 414, 424 and which are releasably fastened to each other using a first fastening unit 43. The second edges 415, 425 of the first portions 411, 421 of the front and rear casing parts 41, 42 cooperatively define a handle opening 45. The second portions 412, 422 of the front and rear casing parts 41, 42 have third edges 416, 426 adjacent to the first edges 414, 424, respectively, and fourth edges 417, 427 adjacent to the second edges 415, 425, respectively. The fourth edges 417, 427 of the second portions 412, 422 of the front and rear casing parts 41, 42 cooperatively define a second handle opening 45'. The fourth edges 417, 427 can be releasably fastened to each other using a second fastening unit 43'. When the casing 4 is disposed in the upright position, the second portions 412, 422 are moved pivotally away from each other about axes of the pivot shafts 413, 423 relative to the first portions 411, 421 for supporting the casing 4 in the upright position. At this time, the second edges 415, 425 are fastened to each other using the first fastening unit 43. A wheel unit including a pair of wheel members 433 is mounted on a lower end of the second portion 422 of the rear casing part 42.

Figure 11:
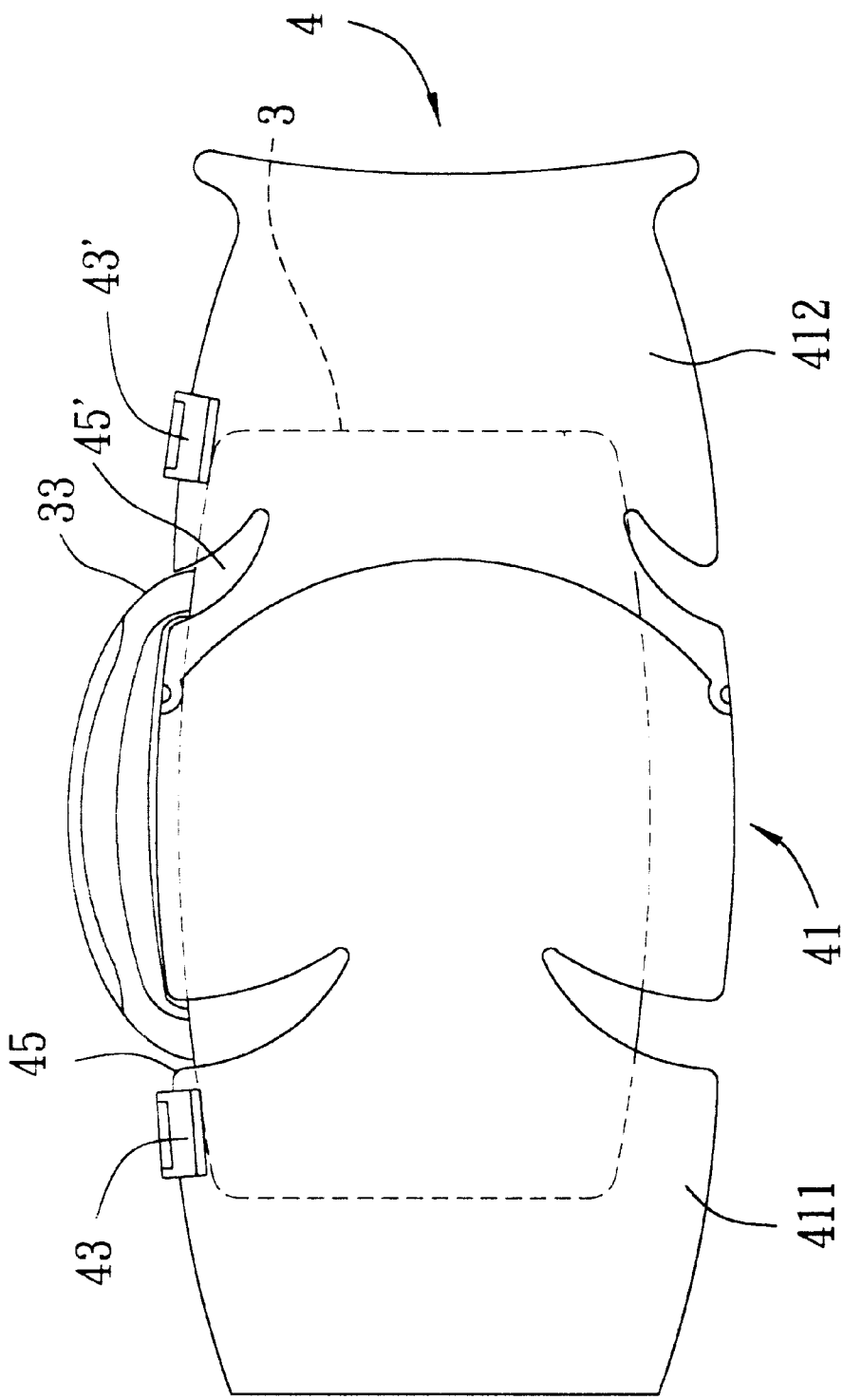
FIG. 11 illustrates a casing of the second preferred embodiment when a cook unit is received in the casing.
Figure 12:
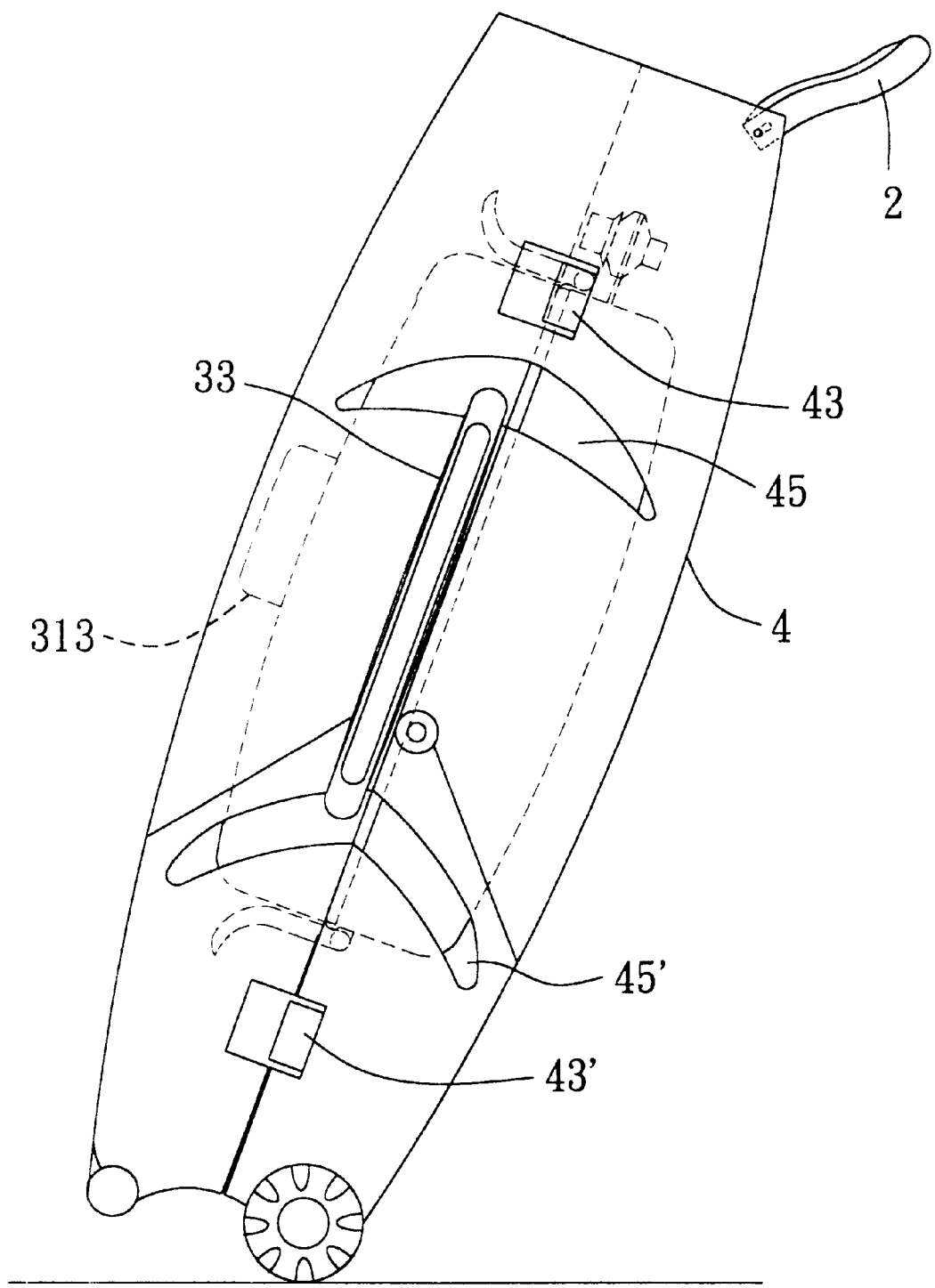
FIG. 12 illustrates how the casing of the second preferred embodiment is moved along a ground surface when the cook unit is received therein.

To store and transport the barbecue grill assembly of the present embodiment, the cook unit 3 is removed from the top of the casing 4, and the casing 4 is opened by unlocking the first fastening unit 43. The cook unit 3 is then received in the casing 4, allowing the handle 33 to extend through the handle openings 45, 45'. Thereafter, the first and second fastening units 43, 43', are locked such that the front and rear casing parts 41, 42 are fastened to each other at both their first and second portions 411, 421, 412, 422. Likewise, the casing 4 may be carried by gripping at the handle 33, as shown in FIG. 11, or may be moved along the ground surface by pulling at the pull ring 2, as shown in FIG. 12.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A barbecue grill assembly comprising:

a cook unit including a cooking base with top and bottom sides, a grill member disposed in said cooking base, a top cover disposed on said top side for covering said grill member and said top side of said cooking base, and a handle mounted on one of said cooking base and said top cover; and a casing having first and second end walls which are spaced apart from and which are opposite to each other in a longitudinal direction, and a surrounding wall extending between and cooperating with said first and second end walls to confine a receiving space for receiving said cook unit therein, said surrounding wall being formed with at least one handle opening that permits extension of said handle out of said casing, said casing including front and rear casing parts which are formed with said first and second end walls and said surrounding wall, said front and rear casing parts having adjacent first edges hinged to each other and second edges opposite to said first edges respectively, said casing further including a fastening unit provided on said front and rear casing parts for releasably fastening together said second edges of said front and rear casing parts.

2. The barbecue grill assembly as claimed in claim 1, wherein said casing is adapted to be supported on a ground surface in an upright position in which said first end wall is disposed above said second end wall, said barbecue grill assembly further comprising means for mounting said cooking base on said first end wall of said casing so as to position said cook unit on top of said casing when said casing is disposed in the upright position on the ground surface.

3. The barbecue grill assembly as claimed in claim 2, wherein said mounting means includes an opening formed in said first end wall and a mounting post that projects downwardly from said bottom side of said cooking base, said mounting post being extendible removably into said opening.

4. The barbecue grill assembly as claimed in claim 2, wherein said surrounding wall of said casing includes a main portion and front and rear support plates, each of which has a hinge end hinged to said main portion of said surrounding wall and a distal end opposite to said hinge end and disposed proximate to said second end wall of said casing, said distal end of each of said support plates being pivotable toward and away from said main portion of said surrounding wall to help support said casing on the ground surface when said casing is disposed uprightly on the ground surface.

5. The barbecue grill assembly as claimed in claim 4, wherein said distal end of said rear support plate is provided with a wheel unit adapted to be in rolling contact with the ground surface when said distal end of said rear support plate is pivoted relative to said main portion of said surrounding wall.

6. The barbecue grill assembly as claimed in claim 4, wherein said front and rear support plates are provided respectively on said front and rear casing parts of said casing.

7. The barbecue grill assembly as claimed in claim 2, wherein said casing further includes a wheel unit mounted on said surrounding wall proximate to said second end wall and a pull member mounted on said surrounding wall proximate to said first end wall and disposed above said wheel unit, said wheel unit being adapted to contact rotatably the ground surface when said casing is in the upright position, said pull member being adapted to be gripped for pulling said casing and enabling said casing to move horizontally along the ground surface when said casing is disposed in the upright position.

8. The barbecue grill assembly as claimed in claim 7, wherein said surrounding wall of said casing includes a main portion and front and rear support plates, each of which has a hinge end hinged to said main portion of said surrounding wall and a distal end opposite to said hinge end and disposed proximate to said second end wall of said casing, said distal end of each of said front and rear support plates being pivotable toward and away from said main portion of said surrounding wall and being adapted to abut against the ground surface to help support said casing on the ground surface when said casing is disposed uprightly on the ground surface, said wheel unit being provided at said distal end of said rear support plate, said distal end of said rear support plate being pivotable relative to said main portion of said surrounding wall to enable said wheel unit to contact rotatably the ground surface.

9. The barbecue grill assembly as claimed in claim 8, wherein said pull member includes a ring portion and a mounting end portion which is connected to said ring portion and which is mounted pivotally on said surrounding wall so as to be pivotable between an unfolded position in which said pull member is unfolded from said surrounding wall, and a folded position in which said pull member is folded toward said surrounding wall, said surrounding wall being provided with means for locking said pull member in said unfolded position, said barbecue grill assembly further including a container which is retained removably on said ring portion of said pull member and which has a top opening, said cooking base of said cook unit being formed with a draining notch that is disposed above and that is registered with said top opening of said container when said pull member is locked in said unfolded position such that liquid which is drained via said draining notch can be collected in said container, said container being removable from said pull member to permit gripping of said ring portion of said pull member.

10. The barbecue grill assembly as claimed in claim 9, wherein said surrounding wall has a mounting recess for mounting said pull member, said mounting recess being defined by a pair of confronting side walls and a connecting wall interconnecting said side walls, each of said side walls being formed with a mounting hole which includes an inner hole portion proximate to said connecting wall and an outer hole portion distal from said connecting wall, said mounting end portion of said pull member having a pair of opposite lateral surfaces confronting said side walls, respectively, and an end face interconnecting said lateral surfaces and confronting said connecting wall, each of said lateral surfaces being formed with a pivot pin that extends rotatably into said mounting hole in a corresponding one of said side walls and that is movable along said mounting hole between said inner and outer hole portions, said locking means including a locking rod projecting from said connecting wall and a locking groove formed in said end face, said locking rod being inserted into said locking groove when said pull member is moved toward said connecting wall to move said pivot pins to said inner hole portions, thereby locking said pull member in said unfolded position, said locking rod being removed from said locking groove when said pull member is pulled away from said connecting wall to move said pivot pins to said outer hole portions, thereby permitting folding of said pull member toward said surrounding wall.

11. The barbecue grill assembly as claimed in claim 1, wherein said surrounding wall of said casing is formed with two of said handle openings, said handle having two connecting end portions connected to said one of said top cover and said cooking base and a gripping portion extending between said connecting end portions, said connecting end portions extending through said handle openings when said cook unit is received in said receiving space of said casing.

12. The barbecue grill assembly as claimed in claim 1, wherein said casing is adapted to be supported on a ground surface in an upright position in which said first end wall is disposed above said second end wall, said casing further including a wheel unit mounted on said surrounding wall proximate to said second end wall, and a pull member mounted on said surrounding wall proximate to said first end wall and disposed above said wheel unit, said pull member being adapted to be gripped for pulling said casing and moving said casing horizontally along the ground surface when said casing is disposed in the upright position.

13. The barbecue grill assembly as claimed in claim 1, wherein said cooking base of said cook unit has a bottom wall and left and right side walls extending upwardly from said bottom wall, said left and right side walls having upper edge portions, said cook unit further including a pair of side racks, each of which has a first end portion pivoted to said upper edge portion of a respective one of said left and right side walls, and a second end portion extending from said first end portion in a first direction, said cook unit further including a pair of handle bars, each of which is secured to said first end portion of a respective one of said side racks and extends in a second direction transverse to said first direction, said side racks being turnable inwardly into said cooking base for moving to a folded position in which said side racks are disposed within said cooking base above said grill member and are covered by said top cover when said top cover is capped on said cooking base, said side racks being further turnable outwardly from said cooking base for moving to an unfolded position in which said side racks are disposed horizontally on opposite left and right sides of said cooking base, said handle bars being oriented downward when said side racks are disposed in the unfolded position and abutting against said left and right side walls, respectively, for supporting said side racks in the unfolded position, said handle bars being oriented upward when said side racks are disposed in the folded position, said cook unit further including a fastening unit mounted on said top cover and said cooking base for releasably fastening together said top cover and said cooking base when said side racks are disposed in the folded position.

14. The barbecue grill assembly as claimed in claim 1, wherein said cook unit further includes a fastening unit mounted on said top cover and said cooking base for releasably fastening together said top cover and said cooking base.

15. A barbecue grill assembly comprising:
a cook unit including a cooking base with top and bottom sides, a grill member disposed in said cooking base, and a top cover disposed on said top side for covering said grill member and said top side of said cooking base;
a casing having first and second end walls which are spaced apart from and which are opposite to each other in a longitudinal direction, and a surrounding wall extending between and cooperating with said first and second end walls to confine a receiving space for receiving said cook unit therein, said casing being adapted to be supported on a ground surface in an upright position in which said first end wall is disposed above said second end wall, said casing further including a wheel unit mounted on said surrounding wall proximate to said second end wall, and a pull member mounted on said surrounding wall proximate to said first end wall and disposed above said wheel unit, said wheel unit being adapted to contact rotatably the ground surface when said casing is in the upright position, said pull member being adapted to be gripped for pulling said casing and enabling said casing to move horizontally along the ground surface when said casing is disposed in the upright position;
means for mounting said cooking base removably on said first end wall of said casing such that said cooking base is positioned on said first end wall when said casing is disposed in the upright position on the ground surface, said mounting means includes an opening formed in said first end wall of said casing and a mounting post projecting downwardly from said bottom side of said cooking base; said mounting post being extendible removably into said opening.

16. The barbecue grill assembly as claimed in claim 15, wherein said surrounding wall of said casing includes a main portion and front and rear support plates, each of which has a hinge end hinged to said main portion and a distal end opposite to said hinge end and disposed proximate to said second end wall of said casing, said distal end of each of said support plates being pivotable toward and away from said surrounding wall so as to be adapted to abut against the ground surface to help support said casing in the upright position on the ground surface, said wheel unit being mounted on said rear support plate and being disposed below said pull member, said distal end of said rear support plate being pivotable relative to said surrounding wall to enable said wheel unit to contact rotatably the ground surface so that said casing is movable horizontally along the ground surface when said casing is disposed in the upright position.

17. A barbecue grill assembly comprising:
a cook unit including a cooking base with top and bottom sides, a grill member disposed in said cooking base, and a top cover disposed on said top side for covering said grill member and said top side of said cooking base;
a casing having first and second end walls which are spaced apart from and which are opposite to each other in a longitudinal direction, and a surrounding wall extending between and cooperating with said first and second end walls to confine a receiving space for receiving said cook unit therein, said casing being adapted to be supported on a ground surface in an upright position in which said first end wall is disposed above said second end wall, said casing further including a unit mounted on said surrounding wall proximate to said second end wall, and a pull member mounted on said surrounding wall proximate to said first end wall and disposed above said wheel unit, said wheel unit being adapted to contact rotatably the ground surface when said casing is in the upright position, said pull member being adapted to be gripped for pulling said casing and enabling said casing to move horizontally along the ground surface when said casing is disposed in the upright position; and
said cook unit further includes a handle mounted on one of said cooking base and said top cover, said surrounding wall of said casing being formed with at least one handle opening that permits extension of said handle out of said casing when said cook unit is received in said casing.

18. The barbecue grill assembly as claimed in claim 17, wherein said casing includes front and rear casing parts which are formed with said first and second end walls and said surrounding wall, said front and rear casing parts having adjacent first edges hinged to each other and adjacent second edges opposite to said first edges respectively, said casing further including a fastening unit provided on said front and rear casing parts for releasably fastening together said second edges of said front and rear casing parts, said second edges of said front and rear casing parts cooperatively defining said handle opening.

19. The barbecue grill assembly as claimed in claim 18, wherein said surrounding wall of said casing is formed with two of said handle openings, said handle having two connecting end portions connected to said one of said cooking base and said top cover and a gripping portion extending between said connecting end portions, said connecting end portions extending through said handle openings when said cook unit is received in said receiving space of said casing.

20. A barbecue grill assembly comprising:
a cook unit including a cooking base with top and bottom sides, a grill member disposed in said cooking base, and a top cover disposed on said top side for covering said grill member and said top side of said cooking base;
a casing having first and second end walls which are spaced apart from and which are opposite to each other in a longitudinal direction, and a surrounding wall extending between and cooperating with said first and second end walls to confine a receiving space for receiving said cook unit therein, said casing being adapted to be supported on a ground surface in an upright position in which said first end wall is disposed above said second end wall, said casing further including a wheel unit mounted on said surrounding wall proximate to said second end wall, and a pull member mounted on said surrounding wall proximate to said first end wall and disposed above said wheel unit, said wheel unit being adapted to contact rotatably the ground surface when said casing is in the upright position, said pull member being adapted to be gripped for pulling said casing and enabling said casing to move horizontally along the ground surface when said casing is disposed in the upright position;
wherein said pull member includes a ring portion and a mounting end portion which is connected to said ring portion and which is mounted pivotally on said surrounding wall so as to be pivotable between an unfolded position in which said pull member is unfolded from said surrounding wall, and a folded position in which said pull member is folded toward said surrounding wall, said surrounding wall being provided with means for locking said pull member in said unfolded position, said barbecue grill assembly further including a container which is retained removably on said ring portion of said pull member and which has a top opening, said cooking base of said cook unit being formed with a draining notch that is disposed above and that is registered with said top opening of said container when said pull member is locked in said unfolded position such that liquid which is drained via said draining notch can be collected in said container, said container being removable from said pull member to permit gripping of said ring portion of said pull member.

21. The barbecue grill assembly as claimed in claim 20, wherein said surrounding wall has a mounting recess for mounting said pull member, said mounting recess being defined by a pair of confronting side walls and a connecting wall interconnecting said side walls, each of said side walls being formed with a mounting hole which includes an inner hole portion proximate to said connecting wall and an outer hole portion distal from said connecting wall, said mounting end portion of said pull member having a pair of opposite lateral surfaces confronting said side walls, respectively, and an end face interconnecting said lateral surfaces and confronting said connecting wall, each of said lateral surfaces being formed with a pivot pin that extends rotatably into said mounting hole in a respective one of said side walls and that is movable along said mounting hole between said inner and outer hole portions, said locking means including a locking rod projecting from said connecting wall and a locking groove formed in said end face, said locking rod being inserted into said locking groove when said pull member is moved toward said connecting wall to move said pivot pins to said inner hole portions, thereby locking said pull member in said unfolded position, said locking rod being removed from said locking groove when said pull member is pulled away from said connecting wall to move said pivot pins to said outer hole portions, thereby permitting folding of said pull member toward said surrounding wall.

22. A barbecue grill assembly comprising:
a cook unit including a cooking base with top and bottom sides, a grill member disposed in said cooking base, and a top cover disposed on said top side for covering said grill member and said top side of said cooking base;
a casing having first and second end walls which are spaced apart from and which are opposite to each other in a longitudinal direction, and a surrounding wall extending between and cooperating with said first and second end walls to confine a receiving space for receiving said cook unit therein, said casing being adapted to be supported on a ground surface in an upright position in which said first end wall is disposed above said second end wall, said casing further including a wheel unit mounted on said surrounding wall proximate to said second end wall, and a pull member mounted on said surrounding wall proximate to said first end wall and disposed above said wheel unit, said wheel unit being adapted to contact rotatably the ground surface when said casing is in the upright position, said pull member being adapted to be gripped for pulling said casing and enabling said casing to move horizontally along the ground surface when said casing is disposed in the upright position;
wherein said surrounding wall has a first section connected to said first end wall, and a second section connected to said second end wall, said casing including front and rear casing parts, each of which has a first portion and a second portion connected pivotally to said first portion, said first portions of said front and rear casing parts cooperatively forming said first end wall and said first section of said surrounding wall, said second portions of said front and rear casing parts cooperatively forming said second end wall and said second section of said surrounding wall, said first portions of said front and rear casing parts having adjacent first edges hinged to each other and adjacent second edges opposite to said first edges respectively, said casing further including a first fastening unit provided on said first portions of said front and rear casing parts for releasably fastening together said second edges of said first portions of said front and rear casing parts, said second portions of said front and rear casing parts being pivotable toward and away from each other to help support said easing in the upright position on the ground surface, said second portions of said front and rear casing parts having third edges adjacent to said first edges of said first portions of said front and rear casing parts, and fourth edges opposite said third edges, respectively, said casing further including a second fastening unit for releasably fastening together said fourth edges.

23. The barbecue grill assembly as claimed in claim 22, wherein said second edges of said first portions of said front and rear casing parts cooperatively define a first handle opening when fastened together, said fourth edges cooperatively defining a second handle opening when fastened together, said cook unit further including a handle mounted on one of said cooking base and said top cover, said handle having two connecting end portions connected to said one of said cooking base and said top cover and a gripping portion extending between said connecting end portions, said connecting end portions extending respectively through said first and second handle openings when said cook unit is received in said receiving space of said casing.

\* \* \* \* \*